United States Patent
Sekino et al.

(10) Patent No.: US 7,109,421 B2
(45) Date of Patent: Sep. 19, 2006

(54) HARNESS HOLDER AND HARNESS LAYOUT STRUCTURE THEREBY

(75) Inventors: Tsukasa Sekino, Shizuoka (JP); Mitsunori Tsunoda, Shizuoka (JP); Tomoyasu Murakami, Hiroshima (JP); Gaku Ito, Shizuoka (JP)

(73) Assignee: Yazaki Corporation, Tokyo (JP)

( * ) Notice: Subject to any disclaimer, the term of this patent is extended or adjusted under 35 U.S.C. 154(b) by 0 days.

(21) Appl. No.: 10/937,496

(22) Filed: Sep. 10, 2004

(65) Prior Publication Data

US 2005/0092511 A1 May 5, 2005

(30) Foreign Application Priority Data

Oct. 31, 2003 (JP) ............................. 2003-372418

(51) Int. Cl.
*H02G 1/00* (2006.01)
(52) U.S. Cl. ................ 174/72 A; 174/71 R; 174/72 C; 174/72 R; 248/71; 248/73
(58) Field of Classification Search ............. 174/72 A, 174/71 R, 72 C, 72 R; 248/71, 73
See application file for complete search history.

(56) References Cited

U.S. PATENT DOCUMENTS 3,711,632 A * 1/1973 Ghirardi ..................... 174/135
6,668,865 B1 * 12/2003 Miyamoto et al. .......... 138/108
6,717,055 B1 * 4/2004 Kato ......................... 174/72 A
2002/0000499 A1 * 1/2002 Aoki et al. ................ 248/74.4

FOREIGN PATENT DOCUMENTS

| JP | 2001-251724 | * | 9/2001 |
| JP | 2002-17032 | | 1/2002 |
| JP | 2002-199558 | | 7/2002 |

* cited by examiner

Primary Examiner—Jinhee Lee
(74) Attorney, Agent, or Firm—Armstrong, Kratz, Quintos, Hanson & Brooks, LLP (57) ABSTRACT

For preventing a slack of a wire harness and bending the wire harness more smoothly, a harness holder includes an inner clamp member for supporting the wire harness and an outer clamp member supporting rotatably the inner clamp member. The slack preventing member is formed longer than the harness guide in a harness leading direction. Mounting the harness holder at a vehicle body and disposing a protector for receiving the wire harness at a slide door, the wire harness is wired from the harness holder to the protector. In a partially opened slide door, the slack preventing member supports the wire harness. In a full opened and a completely closed door, the harness guide supports the wire harness.

8 Claims, 11 Drawing Sheets

FIG. 21B PRIOR ART even in small rotating angle of the inner clamp member, so that the wire harness can be prevented securely from slacking.

HARNESS HOLDER AND HARNESS LAYOUT STRUCTURE THEREBY

The priority application Number Japan Patent Application Laid Open 2003-328123 upon which this patent application is based is hereby incorporated by reference.

BACKGROUND OF THE INVENTION

1. Field of the Invention

This invention relates to a harness holder for wiring a wire harness without a twist from a vehicle body to a slide door to supply electric power continuously, and a harness layout structure by using the harness holder.

2. Description of the Related Art

Figure 17:
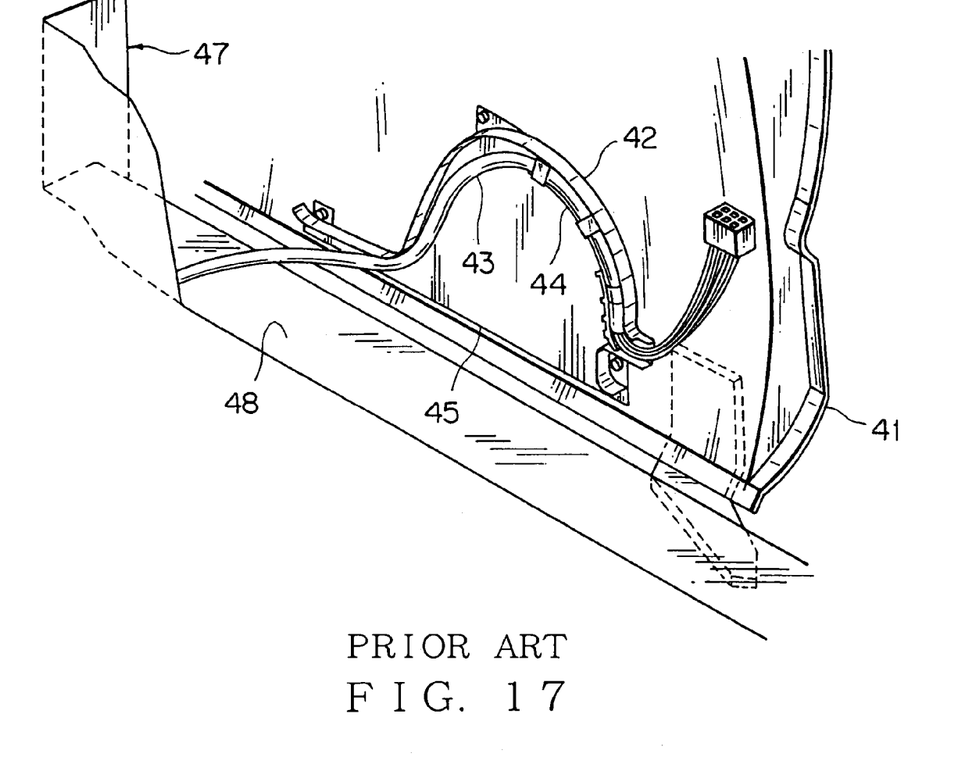
FIG. 17 is a perspective view of one embodiment of a harness layout structure of a slide door in completely closed door by prior art.
Figure 18:
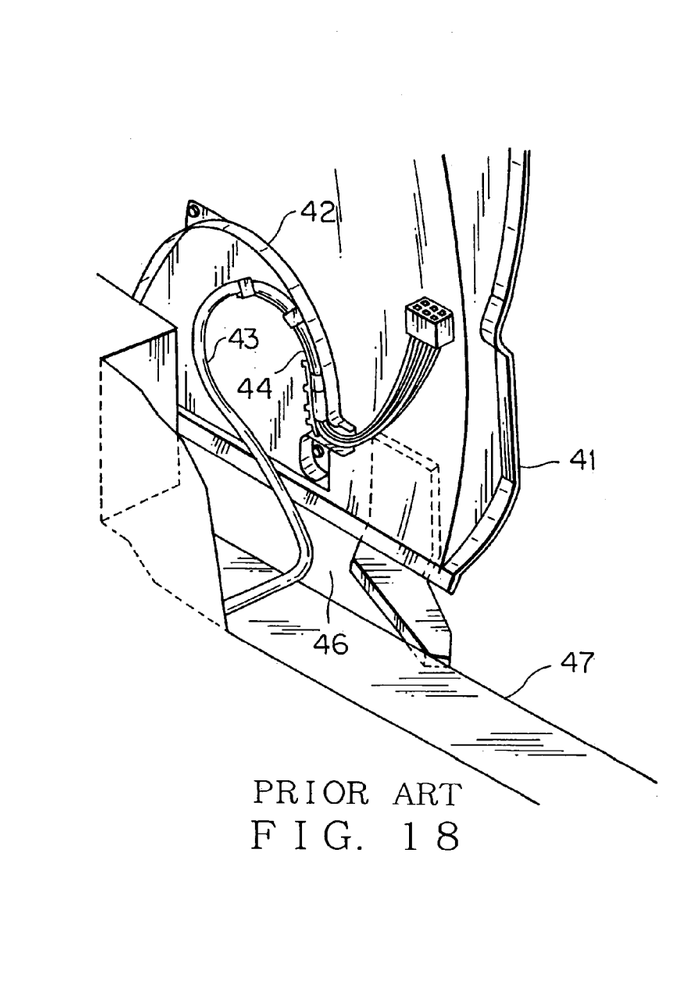
FIG. 18 is a perspective view of the harness layout structure in partially opened door by prior art.

FIG. 17, 18 show an example of a harness layout structure of a slide door by prior art Patent Reference 1).

In the structure, a harness protector 42 (a cover is not shown) is provided at a slide door 41 of a car, and a wire harness 43 pushed upwardly by a flat spring 44 is received freely to be flexed in the protector. One end of the wire harness 43 is led out from a front area of the protector 42 and connected with an auxiliary device at the slide door. The other end of the wire harness 43 is wired from an oval bottom opening 45 of the protector 42 through a traversing space 46 to a vehicle body 47, freely to be swung.

FIG. 17 shows the slide door 41 in completely closed condition, and FIG. 18 shows the slide door 41 close to full open in partially open condition. The wire harness 43 is pulled backwardly when the slide door 41 is in the completely closed condition, and pulled forwardly when the slide door 41 is in the full open condition. Although, especially, the wire harness 43 intends to be slacked downwardly when the slide door 41 is in partially opened condition, the wire harness 43 is prevented from the slack to be pushed upwardly by the flat spring 44.

Figure 19:
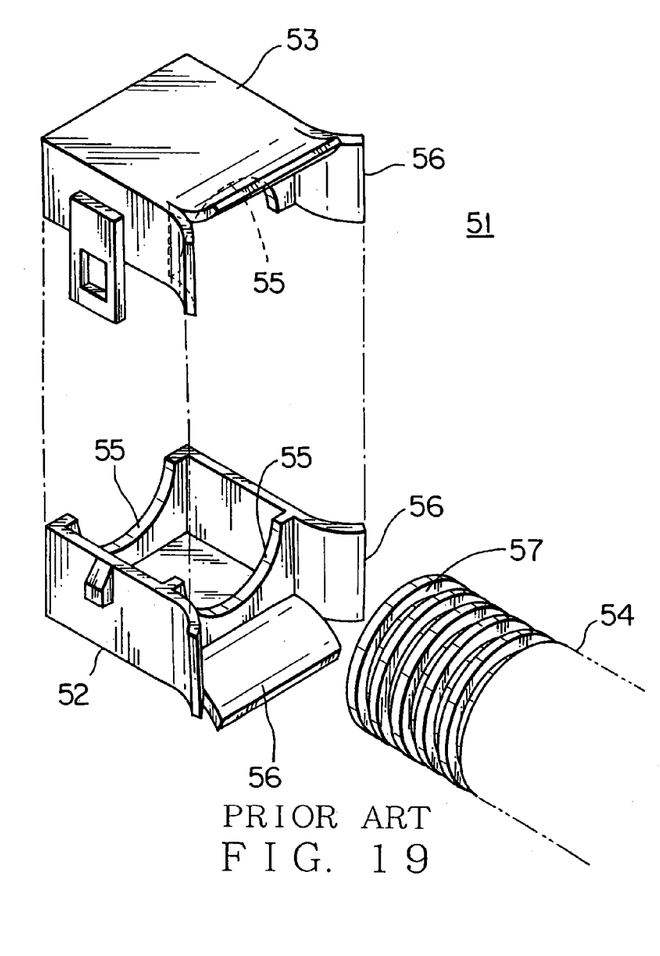
FIG. 19 is a sectional perspective view of one embodiment of a harness holder by prior art.

The wire harness 43 is supported at a step portion 48 of the vehicle body 47 or the near area freely to rotate in circumferential direction by a harness holder 51 shown in FIG. 19. Detail of FIG. 19 is referred in patent reference 2.

The harness holder 51 is divided to an upper half and a lower half of synthetic resin housings 52, 53. The housings 52, 53 are respectively provided with a half-circle opening 55 for supporting a corrugated tube 54 covering outside of the wire harness to rotate freely, and a guide wall 56 for guiding the corrugated tube 54 curvedly. A surrounding groove 57 of the synthetic resin corrugated tube 54 engages with the half-circle opening 55.

In accordance with open-and-close of the slide door 41 shown in FIG. 17, 18, the wire harness 43 (the corrugated tube 54) is bent and twisted in circumferential direction (moving rotationally). The twist is absorbed by the harness holder 51. In accordance with open-and-close of the slide door 41, the wire harness 43 swings back and forth. The guide walls 56 guide the wire harness 43 curvedly, so that the wire harness 43 can be prevented from folding.

When using a corrugated tube with an oval cross-section (not shown), by clamping the corrugate tube with a separated rotation member, the rotation member can be supported in a housing to rotate freely in circumferential direction.

References are follows;

Reference 1: Japan Patent Application Laid open 2002-17032, page 4, FIGS. 4–5;

Reference 2: Japan Patent Application Laid open 2002-199558, page 9, FIG. 6.

Objects to be Solved

Figure 20A:
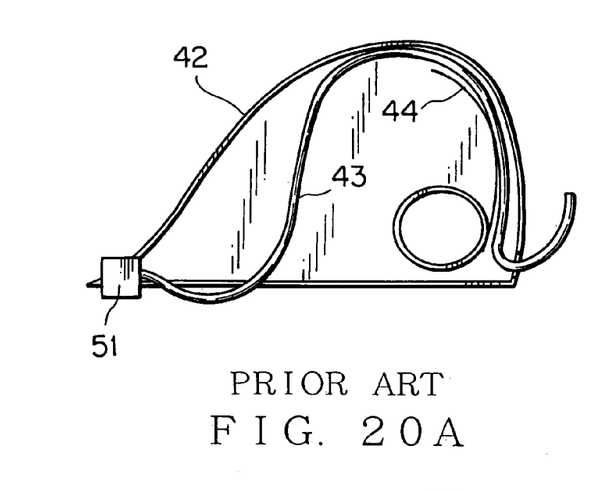
FIG. 20A is a front view of the harness layout structure with a protector having a large total height by prior art.
Figure 20B:
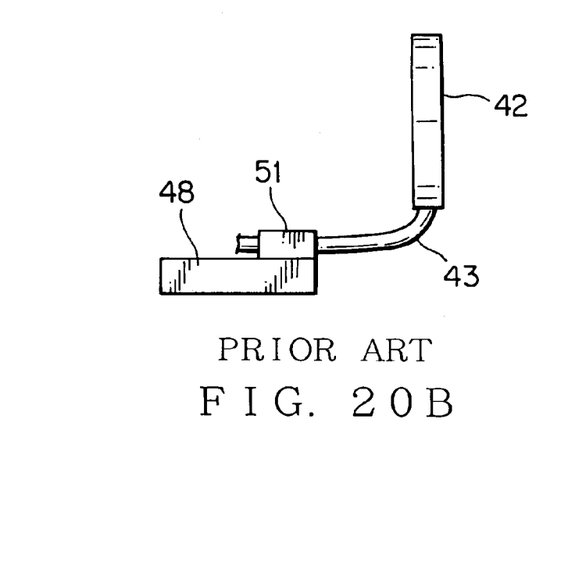
FIG. 20B is a side view of the harness layout structure with a protector having a large total height by prior art.
Figure 21A:
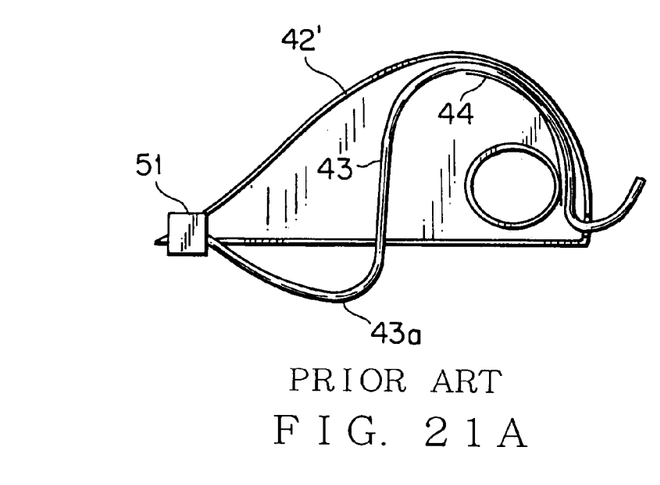
FIG. 21A is a front view of the harness layout structure with a protector having a small total height by prior art.
Figure 21B:
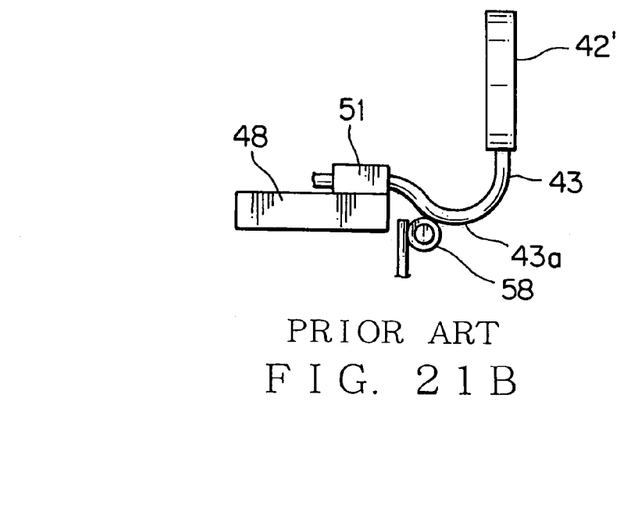
FIG. 21B is a side view of the harness layout structure with a protector having a small total height by prior art.

However, according to aforesaid usual harness holder and the harness layout structure by using that, when an overall height of the protector 42 can be designed high enough as shown in FIG. 20A, 20B, the wire harness 43 is prevented from slacking between the slide door 41 and the vehicle body 47 (the traversing space 46) by the pushing force of the flat spring 44. When the overall height of the protector 42' cannot be designed so high because of layout of the other parts in the slide door of as shown in FIGS. 21A, 21B (the received length of the wire harness 43 is the same), the flat spring 44 cannot absorb the slack of the wire harness 43, and the wire harness 43 has a slack 43a easily. Thereby, the wire harness 43 may interfere with the vehicle body. And the wire harness 43 may be bent with small radius curve at the harness holder 51, so that the wire harness has folding and stress concentration and is worn or damaged. Also, by opening a slit of the corrugated tube, properties of water proof and dust proof are deteriorated.

The curved guide walls 56 (FIG. 19) project from top, bottom, right and left sides of the harness holder 51, so that the dimensions of the harness holder 51 becomes larger to require a large mounting space at the vehicle body, and the looks becomes worse.

When the weather strip 58 for water proof corresponding to the slide door is disposed in the vicinity of the step portion 48 of the vehicle body, the wire harness 43 having the slack in the partially opened condition of the slide door may interfere with the weather strip 58. Thereby, the corrugated tube and the weather strip 58 would be worn. This drawback may be occurred easily not only in the low profile protector 42' but also in the high profile protector 42 (FIG. 20).

To overcome the above drawback, an object of this invention is to provide a harness holder, which can prevent a slack of a wire harness and folding with a small radius of the wire harness at the harness holder so that the wire harness can be prevented from wear and damage by stress concentration and interference with the other parts and can be designed to have compact structure, and a harness layout structure by using the harness holder.

How to Attain the Object

In order to attain the object, a harness holder according to the present invention includes an inner clamp member for supporting a wire harness, the inner clamp member having a slack preventing member for preventing slack of the wire harness, and an outer clamp member for supporting rotatably the inner clamp member. The slack preventing member is formed integrally with a surrounding harness guide.

According to the harness holder mentioned above, the wire harness led out in axial direction along the inner clamp member can be securely prevented from slacking by contacting with the slack preventing member. Because the slack preventing member rotates together with the inner clamp member and the wire harness, the slack preventing member would not rub the wire harness in circumferential direction. When the harness holder is disposed at the vehicle body and the wire harness is wired from the harness holder to the slide door, the wire harness is swung and twisted in accordance with open-and-close of the slide door, and the twisting is absorbed by rotation of the inner clamp member. The slack preventing member can prevent securely the wire harness from slacking, which may occur when the harness holder moves closest to a power supply unit at the slide door in the partial opened condition of the slide door.

The wire harness led out in axial direction along the inner clamp member is bent to contact with the harness guide with no radial gap and led to a power supply side. When the harness guide is disposed at the outer clamp member, the wire harness is led out from the inner clamp member and contacts with the harness guide of the outer clamp member. Therefore, the wire harness is folded with a small radius at a top end of the inner clamp member. By providing the harness guide at the inner clamp member, this drawback is prevented, and the wire harness is bent with a large radius, so that bending stress (stress concentration) of the wire harness is relaxed. Because the harness guide rotates together with the inner clamp member and the wire harness, the harness guide would not rub the wire harness in circumferential direction. The wire harness is supported stably to contact with the harness guide when the slide door is in the complete closed condition and in the full opened condition.

The harness holder is further specified by that the slack preventing member has a curved surface which diameter increases outwardly.

According to the harness holder mentioned above, the wire harness is bent along the curved surface of the slack preventing member to have a smooth and large bending radius. If the slack preventing member has no curved surface, the wire harness may be folded easily at the top end of the slack preventing member. The curved surface can prevent the drawback securely. The stress concentration of the wire harness is extremely relaxed.

The harness holder is further specified by that the harness guide has a curved surface which diameter increases outwardly.

According to the harness holder mentioned above, the wire harness is bent along the curved surface of the harness guide to have a smooth and large bending radius. If the harness guide has no curved surface, the wire harness may be folded easily at the top end of the harness guide. The curved surface can prevent the drawback securely. The stress concentration of the wire harness is extremely relaxed.

The harness holder is further specified by that the slack preventing member is formed longer in a direction of leading the harness out than the harness guide.

According to the harness holder mentioned above, the wire harness is supported in a long length by the long slack preventing member, so that the slack of the wire harness is prevented securely. When the slack preventing member has a curved surface, the wire harness is bent smoothly along the curved surface with a large radius.

The harness holder is further specified by that a cutout is disposed oppositely to the slack preventing member and the harness guide is formed shortly at a side of the cutout.

According to the harness holder mentioned above, the wire harness is supported in a short length by the short harness guide. Thereby, the wire harness is led to have a long effective length from the harness guide to the power supply side and a slacked spare length thereof is controlled short. When the harness guide has a curved surface, a bending point of the wire harness moves to deep side of the inner clamp member, and the wire harness is bent with a large radius from the deep side of the inner clamp member. And an extending length of the wire harness toward the slide door is shortened.

The harness holder is further specified by that an opening is formed along a lengthwise of the harness between the harness guide and the slack preventing member.

According to the harness holder mentioned above, the wire harness can be inserted easily along the opening into the inner clamp member. The opening may be disposed at a position on which the wire harness is pushed not strongly to the harness holder during open-and-close operation of the slide door. The opening prevents unexpected contact between the wire harness and the harness holder, and a weight of the harness holder is decreased and resin molding of the inner clamp member is simplified.

The harness holder is further specified by that the harness guide is continued annularly to the slack preventing member.

According to the harness holder mentioned above, the slack preventing member continues integrally in circumferential direction to the harness guide, so that stiffness of each components is large not to be bent and deformed when contacting with the wire harness.

The harness holder is further specified by that the outer clamp member is provided at the top end thereof with a guide surface being positioned on a surface extending along the curved surface of the harness guide.

According to the wiring device mentioned above, the wire harness is bent with a larger radius by contacting with the curved surface of the harness guide and the curved surface of the outer clamp member. Thereby, the stress concentration of the wire harness is more relaxed by contacting with two points.

A harness layout structure by using the harness holder is specified by including the harness holder, being disposed in a vehicle body, and a protector disposed in a slide door, the protector receiving the wire harness with a spring load, and by that the wire harness is wired from the harness holder to the protector, and the wire harness is supported by the slack preventing member when the slide door is opened partly, and the wire harness is supported by the harness guide when the slide door is opened or closed.

According to the harness layout structure mentioned above, when the slide door is closing, the wire harness is led against the spring load toward an opposite direction of close from the protector by the harness holder as a supporting point. When the wire harness is opening, the wire harness is led against the spring load toward an opposite direction of open from the protector by the harness holder as a supporting point. When the slide door is in a partially opened condition, the protector is the closest to the harness holder. Especially, when the total height of the protector is small, the wire harness intends to be slacked even if having the spring load. At the time, the slack preventing member prevents the slack of the wire harness. When the slide door is in the completely closed condition and in the full opened condition, the harness guide bends the wire harness smoothly with a large radius.

The above and other objects and features of this invention will become more apparent from the following description taken in conjunction with the accompanying drawings.

DESCRIPTION OF THE PREFERRED EMBODIMENT

Figure 1A:
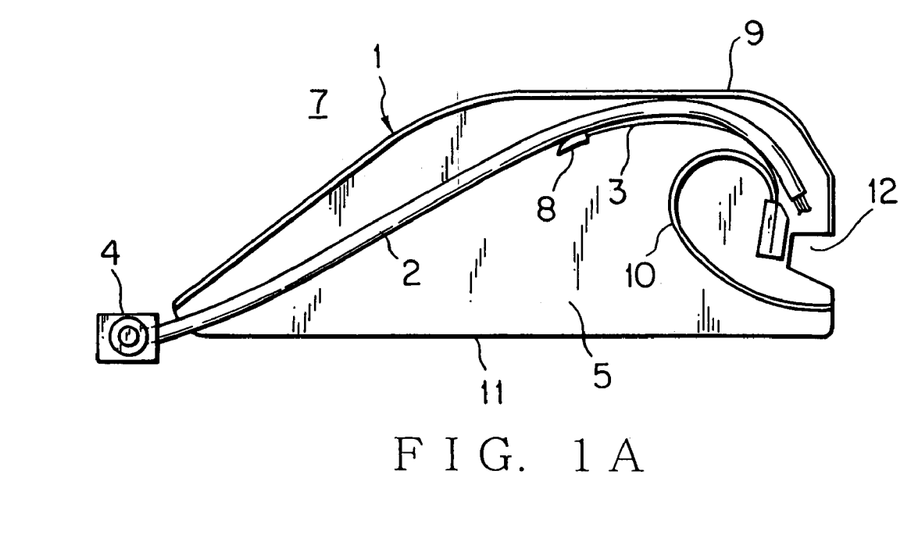
FIG. 1A is a front view of the first embodiment of a harness layout structure by using a harness holder in completely closed slide door according to the present invention.
Figure 1B:
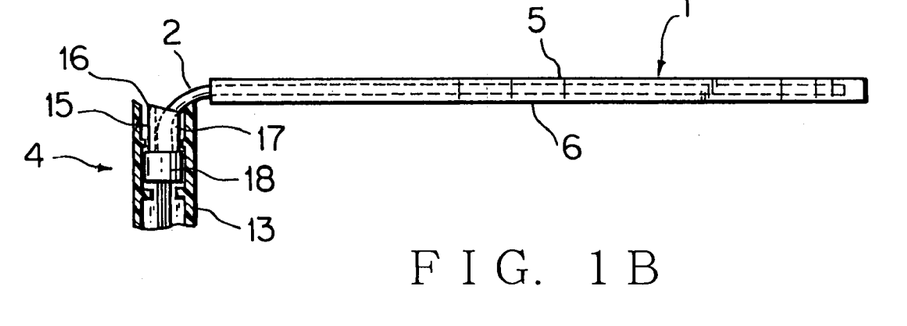
FIG. 1B is a partially sectional plan view of the harness layout structure in FIG. 1A.
Figure 1C:
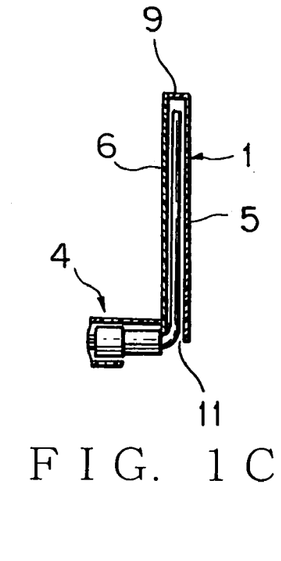
FIG. 1C is a side view of the harness layout structure in FIG. 1A.
Figure 2A:
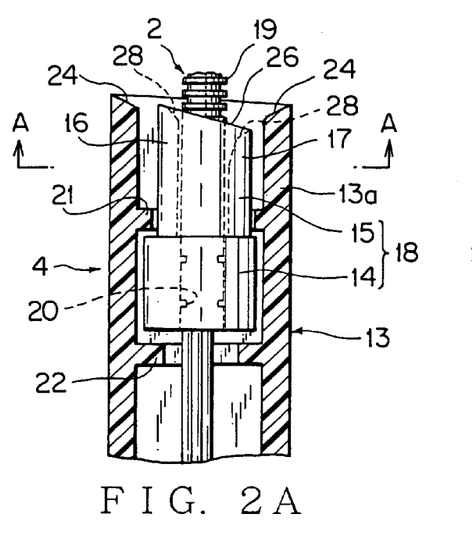
FIG. 2A is a sectional view of the first embodiment of a harness holder according to the present invention.
Figure 2B:
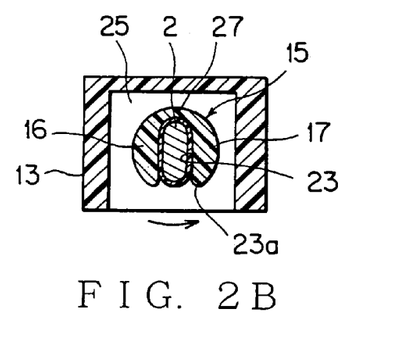
FIG. 2B is a sectional view taking along the line A—A in FIG. 2A.

FIG. 1A, 1B, 1C show a first embodiment of a harness layout structure by using a harness holder according to the present invention. FIG. 2A, 2B show a first embodiment of the harness holder according to the present invention.

In FIGS. 1A, 1B and 1C, the mark 1 shows a synthetic resin harness protector (call protector hereafter) and the mark 2 shows a wire harness, and the mark 3 shows a flat spring (elastic member), and the mark 4 shows a harness holder.

The protector 1 includes a base 5 and a cover 6 (FIG. 1C) A power supply unit 7 includes the protector 1 and the flat spring 3. The protector 1 is designed to have low total height. The protector 1 is disposed vertically between a metal panel of a slide door (not shown) and a resin trim. A base portion of the flat spring 3 is fixed at a front end of the base 5. A top end of the flat spring 3 supports the wire harness with pushing it upwardly through a resin cap 8.

The wire harness 2 is curved with a large radius along a surrounding wall 9 of the base 5. A curve control wall 10 controls the smallest radius of the wire harness 2. One end of the wire harness 2 is led from a oval bottom opening 11 of the protector 1 to a vehicle body side. The other end of the wire harness 2 is led from a front opening 12 of the protector 1 to a slide door side. A basic structure of the protector 1 is the same as that of the usual one.

The harness holder 4 includes a synthetic resin outer clamp member 13 and an inner clamp member 18 (rotating member) disposed in the outer clamp member 13, and is disposed horizontally in a step of the vehicle body. The inner clamp member 18 in the outer clamp member 13 supports the wire harness 2 and can rotate freely in a circumferential direction.

A shown in FIG. 2A, 2B, the synthetic resin inner clamp member 18 is provided integrally with a near annular harness support wall 15 having a member 16 of preventing a slack of the harness and a harness guide 17 integrally. The inner clamp member 18 is provided with a large diameter clamp body 14 and a small diameter harness support wall 15 projecting forwardly from a front end of the clamp body 14. "front and back" of the harness holder in this specification is almost same as "right and left" of the vehicle.

The clamp body 14 is formed into annular shape to have a circular outer surface and an oval inner surface corresponding to a corrugated tube 19 with oval cross-section. The clamp body 14 is divided at the center thereof to engage with together for clamping the corrugated tube 19 between projecting lines 20 on the inner surface. The outer surface is supported slidably in the circumferential direction by an inner surface with a circular cross section of the outer clamp member 13. Displacement in a lengthwise direction between the inner and outer clamp members 18, 13 is prevented by front and rear stoppers 21, 22.

The harness support wall 15 is formed with a slightly smaller radius than the clamp body 14, and has an axially U-shape harness passing groove 23 (harness insert portion) on an inner surface thereof. An outer surface of the harness support wall 15 is formed with a circular cross section to have an opening 23a of the harness passing groove 23. The harness support wall 15 is not completely circular because of the harness passing groove 23. The harness support wall 15 is preferably formed integrally with one of divided parts of the clamp body 14. The one of divided parts of the clamp body 14 engages with the other thereof to form the inner clamp member 18.

The outer surface of the harness support wall 15 abuts slidably on the front stopper 21 of the outer clamp member 13 so as to maintain a gap against an inner surface of the outer clamp member 13. The top end of the outer clamp member 13 is designed to be in the almost same plane of the top end of the harness support wall 15 and provided with an inwardly tapered surface 24 (second guide surface). A wall 13a forward from the front stopper 21 of the outer clamp member 13 is formed at inner and outer surfaces into a rectangular shape as shown in FIG. 2B. The front stopper 21 has a circular inner surface and forms a part of a partition wall perpendicular to the wall 13a. A space 25 is formed in front of the front stopper 21 and between the wall 13a and the clamp body 14.

The slack preventing member 16 of the harness support wall 15 projects forwardly longer than the harness guide 17. The top end of the harness support wall 15 is tapered continuously from the slack preventing member 16 to the harness guide 17 (180 degrees opposite side), as a taper 26 as shown in FIG. 2A. A harness guide 27 continues to a position in a 90 degrees direction from the slack preventing member 16 (a bottom side of the harness passing groove). An inside of the top end of the harness support wall 15 is formed around with a curved surface 28 (guide surface). Thus, the curved surface 28 for bending the wire harness 2 smoothly is formed on the insides of the top ends of the member of protecting the slack 16 and harness guides 17, 27. The curved surface 28 continues smoothly to the inner surface of the harness support wall 15. The tapered surface 24 at the top end of the outer clamp member 13 is on a surface extending along the curved surface 28 of the harness guide 17, 27.

The curved surface 28 of the slack preventing member 16 is disposed at the near same axial position as the tapered surface 24 of the outer clamp member 13 and at radially inner position or the outer clamp member 13. Thereby, the wire harness 2 led along the slack preventing member 16 goes toward the slide door side not to contact with the tapered surface 24 of the outer clamp member 13, i.e. without the slack (see FIG. 1C). The wire harness 2 bent along the curved surface 28 of the harness guide 17 is bent with a large radius and without folding by contacting with the tapered surface 24 of the outer clamp member 13 (see FIG. 1B).

A wire harness by prior art goes along a curved guide wall of an outer clamp member, but the wire harness 2 goes along the curved surface 28 at the top end of the inner clamp member 18. In other words, the wire harness 2 contacts with a guide (28) at a radially inner position, not at a radially outer position from an axis of the wire harness. Thereby, the wire harness 2 is bent smoothly with a large radius and without folding. By prior art, the wire harness may be folded easily with a small radius at an area from the inner clamp member to a guide wall of the outer clamp member.

The outer clamp member 13 is good enough to perform only supporting the inner clamp member 18 rotatably in the circumferential direction. Therefore, the outer clamp member 13 has no curved guide walls by prior art and is miniaturized, and the harness holder 4 is totally miniaturized.

The wire harness 2 and the harness support wall 15 rotate integrally in the circumferential direction so that there is no sliding friction (wear) between the wire harness 2 and the harness support wall 15. Usually, only the wire harness 2 rotates against the outer clamp member 13 so that there is sliding friction (wear) between the wire harness 2 and the outer clamp member 13.

FIGS. 1A, 1B and 1C show the slide door in complete closed condition. The wire harness 2 is pulled in a backward direction of the vehicle in the protector 1 and led out from a rear portion of the bottom opening 11. The wire harness 2 is bent smoothly along the curved surface 28 (FIG. 2A) of the harness guide 17 at a right side of the inner clamp member 18 (front side of the vehicle) as shown in FIG. 1B. The wire harness 2 is bent with a large radius from the harness guide 17 along the tapered surface 24 (FIG. 2A) at the top end of the outer clamp member 13 to disperse stress by the large radius and two supporting points. The flat spring 3 is bent downwardly and pushes the wire harness 2 upwardly.

When the slide door is in completely closed condition, the harness holder 4 is disposed to make the opening 23s of the harness passing groove 23 face downward (the bottom of the groove face upward) as shown in FIG. 2B. The harness guide 17 with a shorter length is disposed at the front side of the vehicle for supporting the wire harness in a curved shape. The slack preventing member 16 with a longer length is disposed at the rear side of the vehicle not to contact with the wire harness 2. The wire harness 2 is pulled forwardly from the harness holder 4 so that the wire harness 2 may not be slacked from the opening 23a of the harness passing groove 23.

Figure 3A:
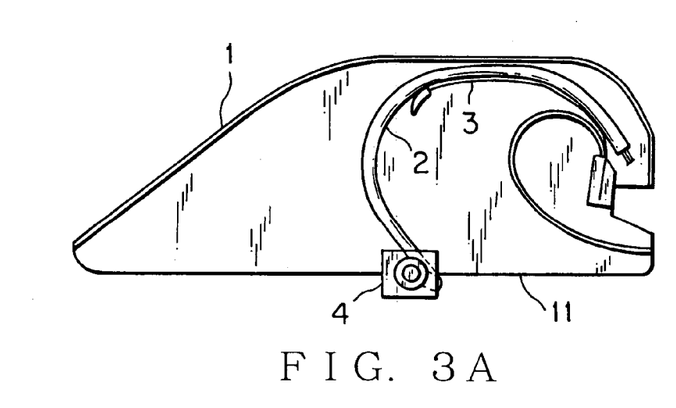
FIG. 3A is a front view of the harness layout structure by using the harness holder in partially opened slide door.
Figure 3B:
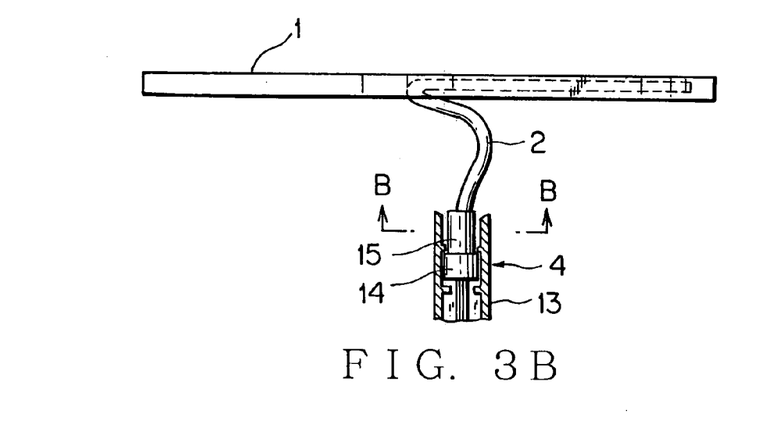
FIG. 3B is a plan view of the harness layout structure by using the harness holder in partially opened slide door.
Figure 3C:
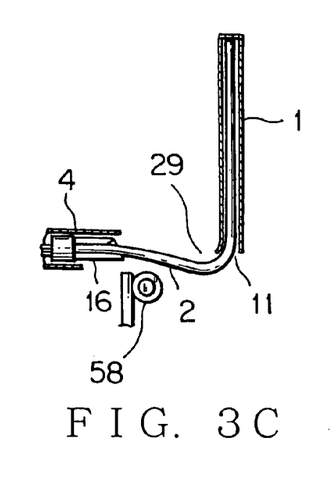
FIG. 3C is a side view of the harness layout structure by using the harness holder in partially opened slide door.

When the slide door is moved in a backward direction of the vehicle to be opened partially as shown in FIGS. 3A–3C, the slack of the wire harness 2 cannot be absorbed by only pushing load of the flat spring 3 (because the total height of the protector 1 is designed short). The long slack preventing member 16 of the harness support wall 15 of the inner clamp member 18 supports the spare length portion (to be slacked) for preventing the slack. Thereby, in the traversing space between the vehicle body and the slide door (the distance of the traversing space 29 is wider than that in the completely closed condition in FIG. 1C), the wire harness 2 is led into the bottom opening 11 of the protector 1 at the slide door side without the slack and to be horizontal or slightly slant downwardly. The curved surface 28 at the top end of the slack preventing member 16 makes the wire harness slant smoothly in a slightly downward direction.

Figure 4:
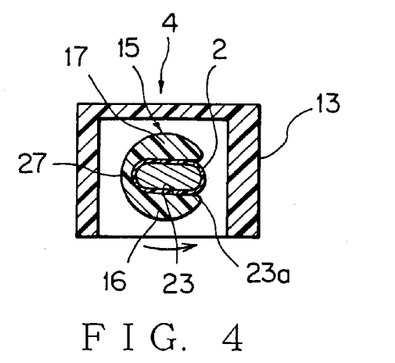
FIG. 4 is a sectional view taking along the line B—B in FIG. 3B.

FIG. 4 shows the harness holder 4 corresponding to FIG. 3A. The harness support wall 15 of the harness holder 4 rotates 90 degree along an arrow from a position in the completely closed condition of the door in FIG. 2B and the long slack preventing member 16 at bottom side supports the wire harness 2 without the slack. The harness support wall 15 absorbs twist of the wire harness 2 to be rotated integrally with the clamp body 14 by the twist of the wire harness 2.

The wire harness 2 led from the harness holder 4 goes perpendicular to the protector 1 at the slide door side as shown in FIG. 3B, so that the wire harness 2 will not come out of the opening 23a of the harness passing groove 23. The wire harness 2 is supported to abut on the curved surface 28 (FIG. 2A) of the harness guide 27 at the bottom side (front side of the vehicle) of the harness passing groove 23.

Figure 5A:
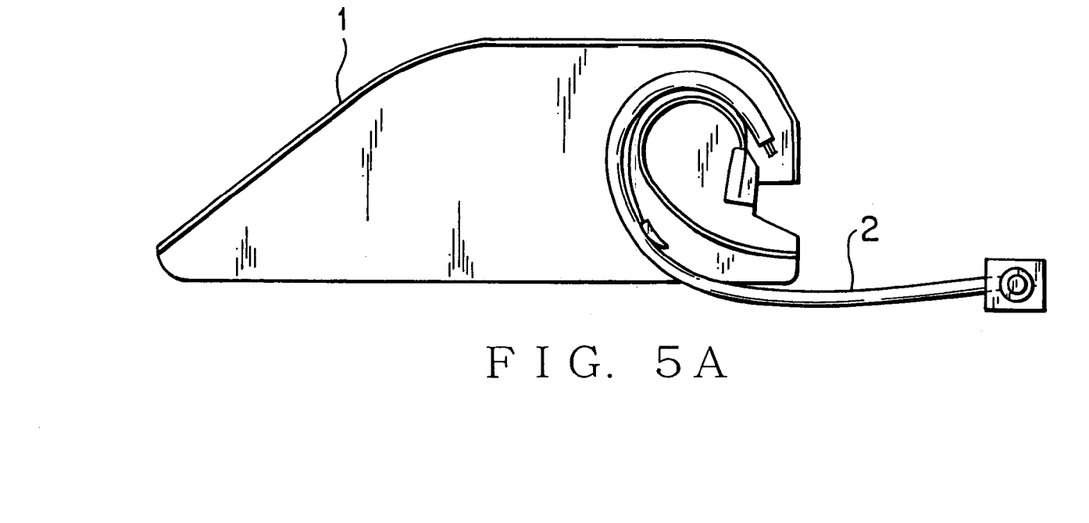
FIG. 5A is a front view of the harness layout structure by using the harness holder in full opened slide door.
Figure 5B:
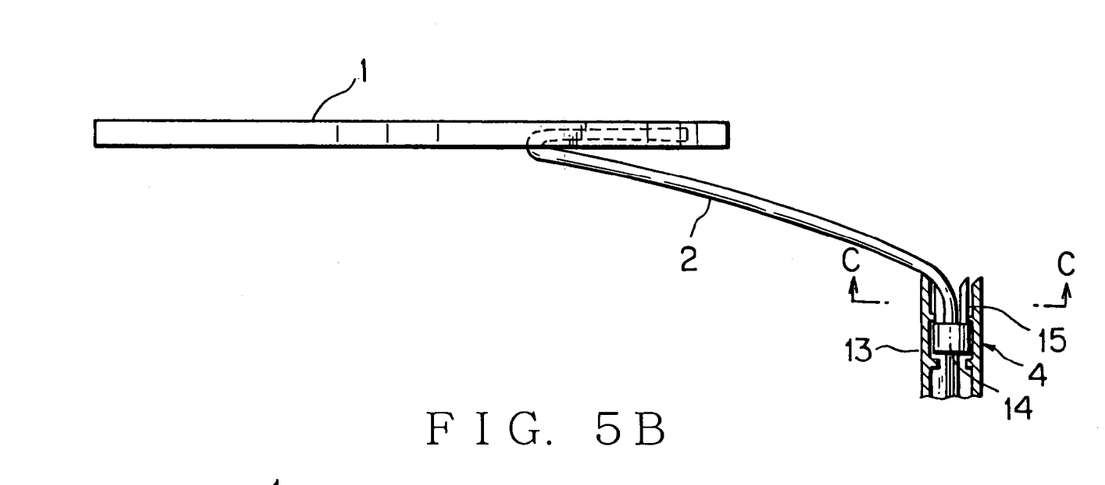
FIG. 5B is a plan view of the harness layout structure by using the harness holder in full opened slide door.
Figure 5C:
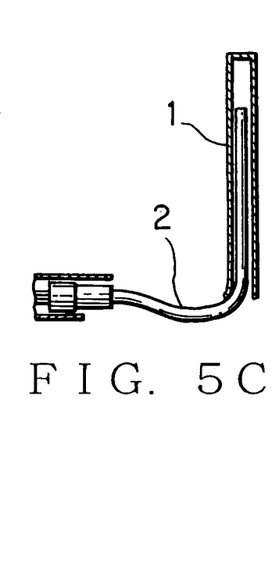
FIG. 5C is a side view of the harness layout structure by using the harness holder in full opened slide door.
Figure 6:
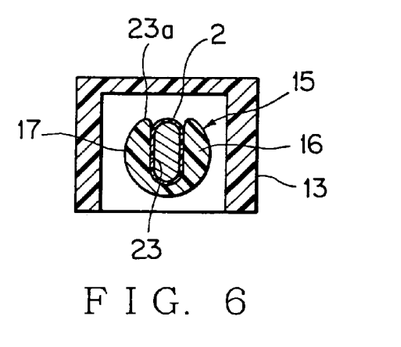
FIG. 6 is a sectional view taking along the line C—C in FIG. 5B.

When the slide door is further moved backwardly to be in the full opened condition from the partially opened condition in FIG. 3A, the wire harness 2 is pulled forwardly from the protector 1 as shown in FIGS. 5A–5C. And the harness support wall 15 of the harness holder 4 rotates 90 degree along the arrow in FIG. 4 as shown in FIG. 5. Thereby, the wire harness 2 is bent smoothly along the curved surface 28 (FIG. 2A) at the top end of the harness guide 17 opposite to the slack preventing member 16. The wire harness 2 is bent with a large radius from the harness guide 17 along the tapered surface 24 (FIG. 2A) at the top end of the outer clamp member 13 to disperse stress by the large radius and two supporting points. The flat spring 3 is bent with a small radius for pushing the wire harness 2 to be restored. The opening 23a of the harness passing groove 23 is disposed upwardly.

In the partially opened condition during the slide door is moved forwardly from the full opened condition in FIG. 5A to be closed, the wire harness 2 is prevented from slack by supporting with the slack preventing member 16 in actions opposite to the actions in FIGS. 3A, 5A. In the full opened condition and the completely closed condition, the wire harness 2 is bent smoothly with a large radius by the curved surface 28 of the harness guide 17 and the tapered surface 24 of the outer clamp member 13 to disperse stress by the large radius and two supporting points.

The tapered surface 24 at the top end of the outer clamp member can be changed to a curved surface. The curved surface 28 at the top end of the harness support wall at the inner clamp member side can be changed to a tapered surface. By making the axial length of the outer clamp member 13 shorter than that of the harness support wall 15, the wire harness 2 can be supported only by the curved surface 28 at the top end of the harness support wall. The curved surface 28 is formed preferably within a thickness of the harness support wall 15. However, the top end of the harness support wall may be extended outwardly within a space between the outer clamp member 13, and a longer curved surface can be formed on the extended top end.

The harness support wall 15 of the harness holder 4 according to this embodiment has the harness passing groove 23 with U-shape cross section for inserting the corrugated tube 19 with oval cross section. By forming an oval through hole instead of the passing groove 23, the harness support wall can be formed into two divided parts together with the inner clamp member. In this case, the harness support wall is annular. When using a corrugated tube with round cross section instead of the corrugated tube 19 with oval cross section, a harness support wall having a harness through hole with round cross section may be formed. When a protection tube other than the corrugated tube or a winding tape is used, a divided-type inner clamp member can clamp the protection tube or the winding tape.

Instead of integrated resin mold, the clamp body 14 and the harness support wall 15 may be formed separately and engaged with together by engaging means. The slack preventing member 16 and the harness guide 17 of the harness support wall 15 can be formed separately. When the wire harness 2 does not contact with the curved surface 28 in FIG. 3C, the curved surface 28 may not be formed. The axial lengths of the slack preventing member 16 and the harness guides 17, 27 can be the same, i.e. the top end of the harness support wall 15 can be formed into a plane perpendicular to the axis instead of a plane slant to the axis.

A protector winding the wire harness in a reel by spring load can be used as the power supply unit 7. Instead of the flat spring 3 in the protector, other elastic member can be used.

The harness holder and the harness layout structure described above can be applied for various slide doors and slide mechanisms other than the slide door of the vehicle. The harness holder 4 can be disposed in the slide door and the protector 1 can be disposed in the vehicle body side. One harness holder 4 or more may be disposed in the vehicle body regardless of supplying power, and a bent wire harness can be wired between the harness holders. These all variation can be applied to the second embodiment.

FIGS. 7–16 show the second embodiment of the harness holder and the harness layout structure according to the present invention.

Figure 7:
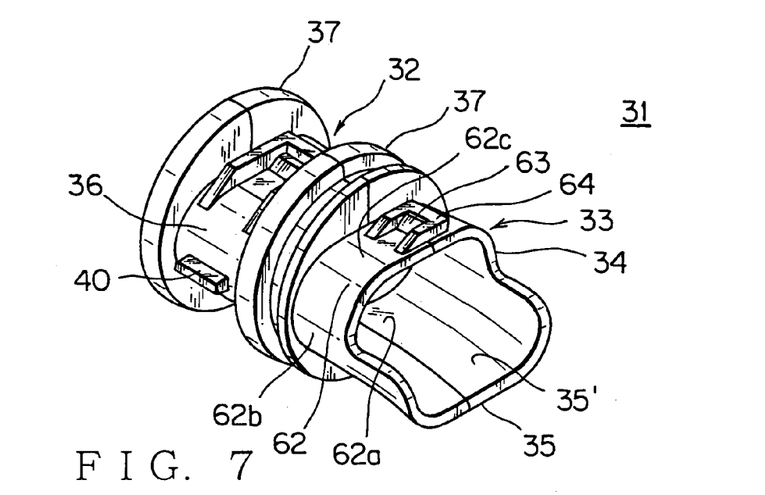
FIG. 7 is a perspective view of the second embodiment of an inner clamp member of a harness holder according to the present invention.
Figure 8:
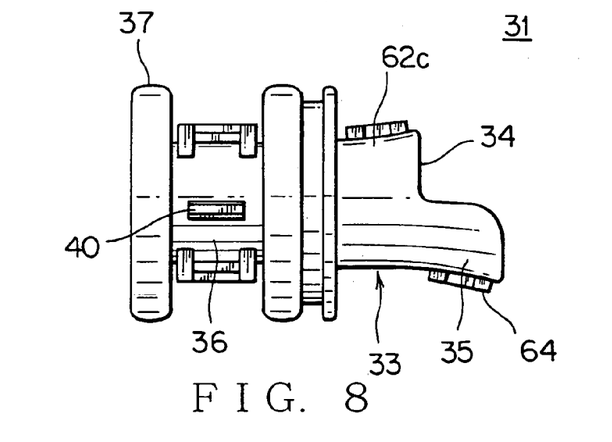
FIG. 8 is a side view of the inner clamp member.
Figure 9:
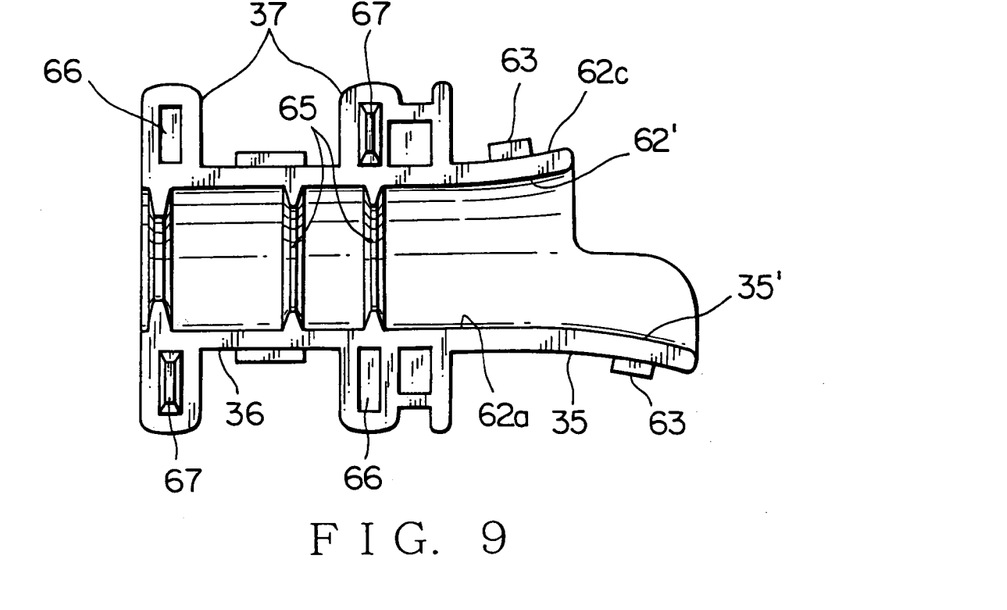
FIG. 9 is a plan view of one of the divided inner clamp member.

FIGS. 7–9 show one example of an inner clamp member 31 of a harness holder. The inner clamp member 31 made of synthetic resin is provided with a harness support wall 33 having an oval cross section at a front side of a clamp body 32, and a cutout 34 to cut a upper half of the harness support wall 33, and a slack preventing member 35 projecting forwardly below the cutout 34.

The clamp body 32 includes a cylindrical portion 36 with an oval cross section, round slide portions 37 formed integrally at front and rear ends of the cylindrical portion 36.

Figure 10:
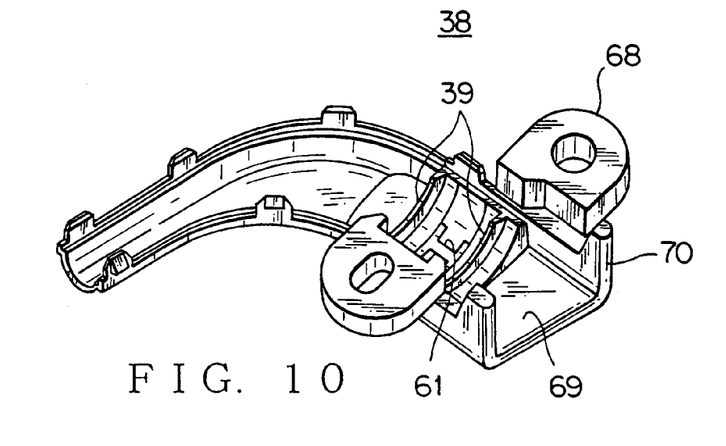
FIG. 10 is a perspective view of one embodiment of one of a divide outer clamp member.

Each slide portion 37 is received rotatably in an inner space of a projecting line 39 (stopper) of an outer clamp member 38 in FIG. 10.

The cylindrical portion 36 is provided at right and left sides of wide width with a pair of projections 40 (stoppers). The outer clamp member 38 (FIG. 10) is provided on an inner surface of the receiving space with a projecting line 61 for abutting on the projections 40. Thereby, the outer clamp member 38 can rotate freely in a range of 180 degree until the projection 40 abuts on the projecting line 61. FIG. 10 shows upper one of divided outer clamp member 38. The inner clamp member 31 and the outer clamp member 38 form the harness holder.

In FIGS. 7–9, the harness support wall 33 of the inner clamp member 31 is formed by extending the cylindrical portion 36 in an axial direction and provided with a cylindrical portion 62 (harness guide) with a oval cross section and a slack preventing member 35 extending from a bottom half of the cylindrical portion 62 to be formed together. The slack preventing member 35 continues integrally to a wall 62a at a narrow width side of the cylindrical portion 62, a wall 62b from a narrow width side to the wide width side and the cutout 34 at the wide width side. The slack preventing member 35 has a half of an oval cross section in radius direction, nearly same as a cross section of a bottom half of the cylindrical portion 62.

As shown in FIGS. 8, 9, a wall 62c at the cutout 34 is curved outwardly with a large radius from a foot side thereof. The wall 62a at the slack preventing member 35 is formed near straight, and the slack preventing member 35 is curved with a large radius from the wall 62a. Each curved portion of marks 35, 62c has the almost same curvature radius. Each curved portion has each curved surface at inner and outer sides. Inner curved surfaces are marked with 35', 62'. The wire harness is bent with a large radius along each curved portion. The wall 62b (FIG. 7) at a wide width side of the cylindrical portion 62 extends straight without curvature. FIG. 9 shows one of dividable inner clamp member 31.

The inner clamp member 31 can be divided into right and left parts to be locked together by a locking device of a locking projection 63 and an engaging frame 64 (FIG. 7). The locking device is disposed separately at the clamp body 32 and the harness support wall 33. By disposing the locking device at a front side of the slack preventing member 35 (FIG. 8), the slack preventing member 35 when assembling the inner clamp member 31 has increased stiffens (strength of assembly).

As shown in FIG. 9, the cylindrical portion 36 of the inner clamp member 31 is provided on an inner surface thereof with annular projecting lines 65 engaging with grooves of the corrugated tube. The round slide portions 37 of the cylindrical portion 36 are divided to right and left parts to be combined together without displacement by engaging a concave portion 66 and a convex portion 67.

The inner clamp member 31 is received rotatably in an inner side of the one divided outer clamp member (mark 38) in FIG. 10 and the other not-shown divided outer clamp member. A bracket 68 of the outer clamp member 38 is secured with a bolt on the vehicle body. The wire harness is inserted in the inner clamp member 31 in a previous process, and the corrugated tube is supported rotatably in a circumferential direction. A side wall 69 of the outer clamp member 38 is provided at a top end thereof with a curved surface 70 or a tapered surface for contacting with the wire harness smoothly.

Figure 11:
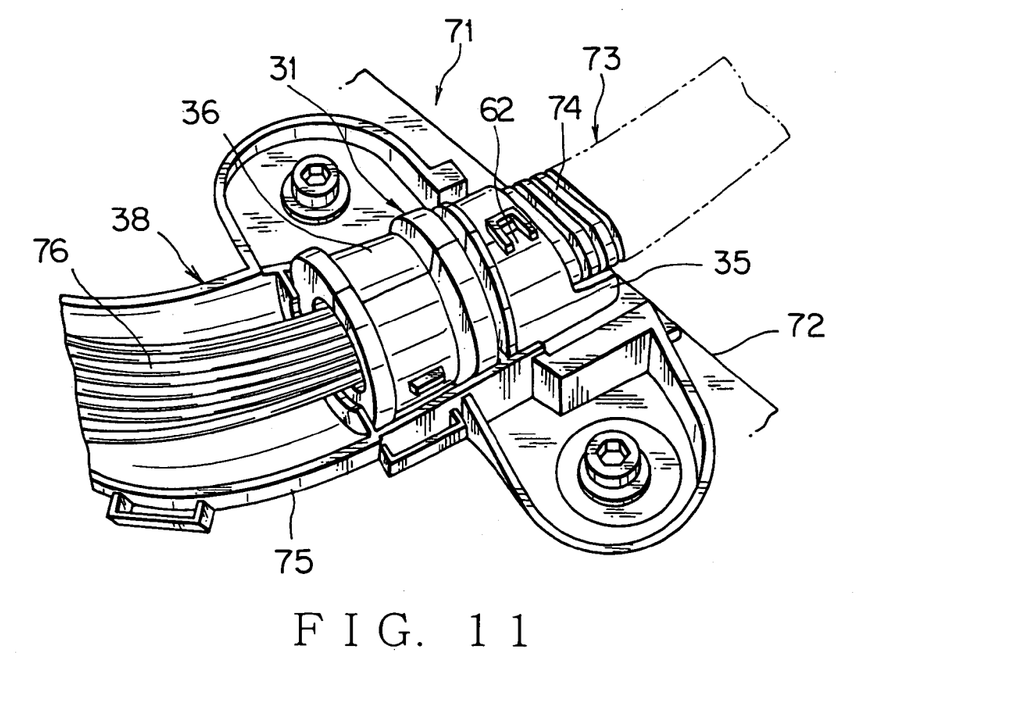
FIG. 11 is a perspective view, showing a condition of mounting the harness holder on a vehicle body.

FIG. 11 shows a harness holder 71 assembled in a vehicle body 72 (the inner clamp member 31 assembled in the lower divided outer clamp member). When the slide door is in the partially opened condition, the slack preventing member 35 of the inner clamp member 31 is positioned at a bottom side, and supports the wire harness 73 at an upper side thereof without the slack. The wire harness 73 may have a small slack to be slightly inclined downwardly by a weight of the wire harness. But, the slack is small not to interfere with a weather strip 58 or other parts (FIG. 3).

The slack preventing member 35 is curved outwardly, so that the wire harness 73 is bent smoothly with a large radius from the foot of the slack preventing member 35, not bent with a small radius from the top end of the slack preventing member 35. Thereby, a stress loading on the wire harness 73 is relaxed and bending durability of the wire harness 73 is improved and a time-dependent damage and wear are prevented. The corrugated tube 74 of the wire harness 73 is ended in the inner clamp member 31. A plurality of electric wires 76 of the wire harness 73 is exposed and wired in a rear extended portion 75 of the outer clamp member 38.

Figure 12:
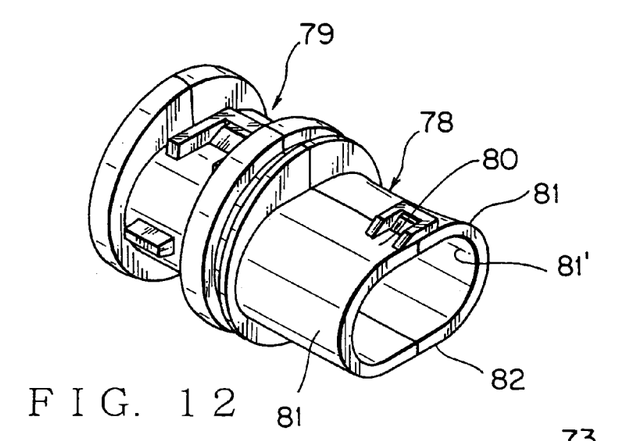
FIG. 12 is a perspective view of the other embodiment of the inner clamp member.

FIG. 12 shows an inner clamp member 77 that eliminates the cutout 34 from the inner clamp member 31 in FIG. 7. The inner clamp member 77 includes a harness support wall 78 with a oval cross section and a clamp body 79. The harness support wall 78 has an outward curved portion 80 at one of narrow width sides, two outward curved portions 81 at wide width sides. A bottom straight wall performs as a slack preventing member 82 and other walls (curved portions) performed as harness guides 80, 81.

The harness support wall 78 may be provided only at one of the narrow width sides (wall 80 opposite 180 degree to the slack preventing member 82) with the curved portion or provided only at both of the narrow width sides (the slack preventing member 82 and the wall 80 opposite 180 degree thereto) with the curved portions. Each curved portion has inner and outer curved surfaces. The inner curved surface is marked with 81'. The clamp body 79 in FIG. 12 is the same as that in FIG. 7, so that description about it is omitted.

Figure 13:
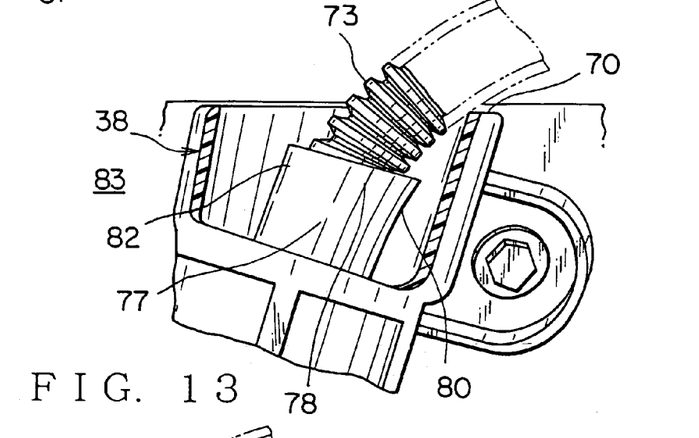
FIG. 13 is a plan view, showing the condition of the completely closed door by using the inner clamp member in FIG. 12.
Figure 14:
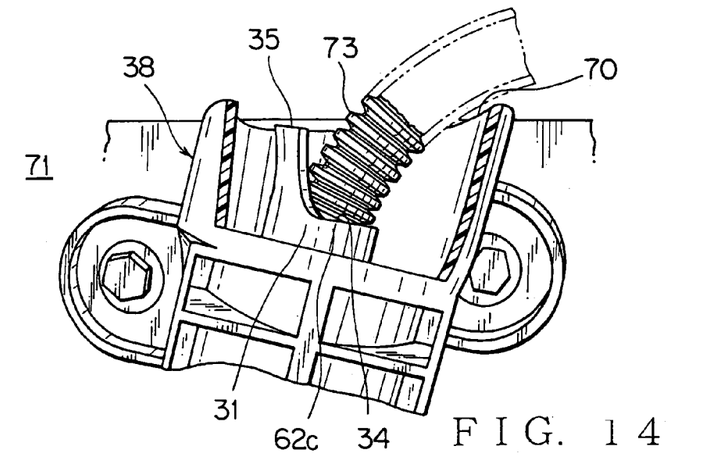
FIG. 14 is a plan view, showing the condition of the completely closed door by using the inner clamp member in FIG. 7.
Figure 15:
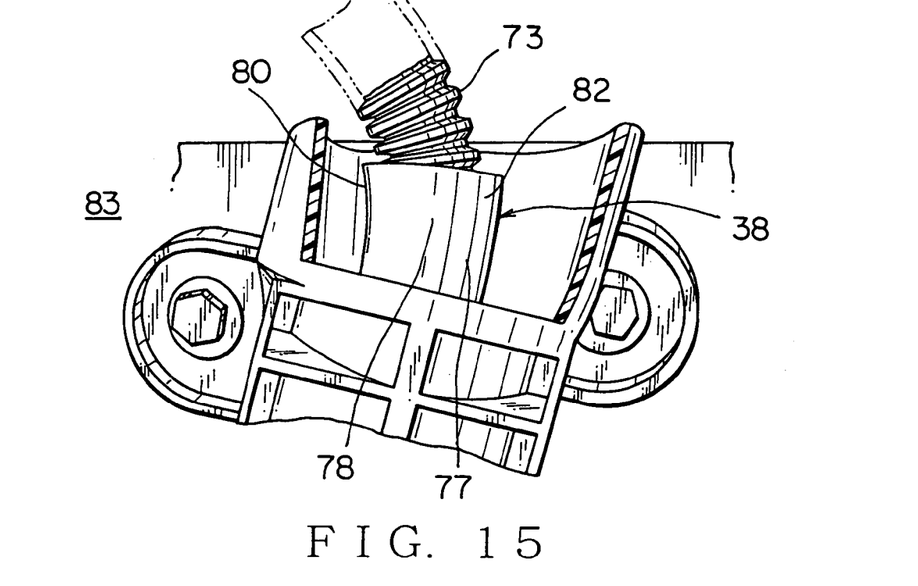
FIG. 15 is a plan view, showing the condition of the full opened door by using the inner clamp member in FIG. 12.
Figure 16:
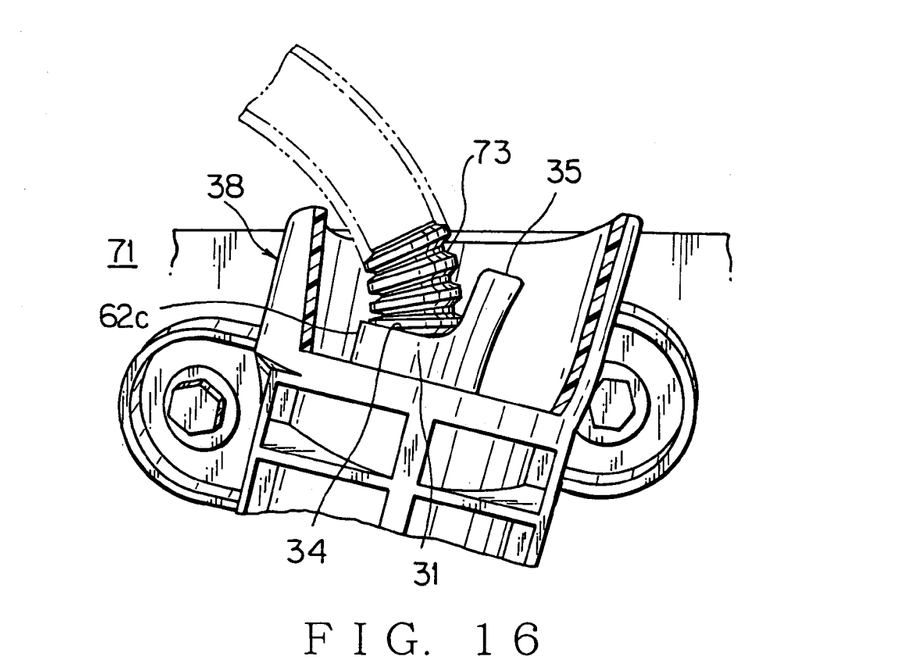
FIG. 16 is a plan view, showing the condition of the full opened door by using the inner clamp member in FIG. 7.

FIGS. 13–16 show comparatively actions (curving of the wire harness) of the harness holders 71, 83 to be mounted with each inner clamp member 31, 77 in FIGS. 7, 12. FIGS. 13, 14 show conditions in the completely closed slide door and FIGS. 15, 16 show conditions in full opened slide door.

As shown in FIG. 13 that the inner clamp member 77 in FIG. 12 is used, the wire harness 73 is bent with a large radius along the curved portion 80 of the inner clamp member 77 and led outwardly to contact smoothly with the curved surface 70 at the top end of the outer clamp member 38 in completely closed door. When the harness support wall 78 is formed straight not providing the curved portions 80, 81 at the harness support wall 78, the wire harness 73 may be folded easily at the top end of the harness support wall 78 as a supporting point.

As shown in FIG. 14 that the inner clamp member 31 in FIG. 7 is used, the wire harness 73 goes into the cutout 34, and is bent from a foot of the cutout 34, i.e. a deep side in the wall 62c (bending point of the wire harness moves to inside of the vehicle). Thereby, Bending radius of the wire harness 73 is larger than that in FIG. 13, and folding the wire harness 73 may not be concerned. The wire harness 73 is led to contact smoothly with the curved surface 70 at the top end of the outer clamp member 38. In FIG. 13, the wire harness 73 is bent smoothly along the curved portion 80 of the harness support wall 78. In FIG. 13, 14, the slack preventing members 35, 82 is located at a position 180 degree opposite to a bending direction of the wire harness 73.

As shown in FIG. 15 when using the inner clamp member 77 in FIG. 12, the wire harness 72 is bent with a large radius along the curved portion 80 of the inner clamp member 77 and led outwardly with a gap against the top end of the outer clamp member 38 in full opened door. If the harness support wall 78 is designed straight without a curved portion, the wire harness 73 may be folded easily at the top end of the harness support wall as a supporting point.

As shown in FIG. 16 when using the inner clamp member 31 in FIG. 7, the wire harness 73 goes into the cutout 34 and is bent from a foot of the cutout 34, i.e. a deep side of the short wall 62c (bending point moves to inside of the vehicle). The wire harness 73 is bent with a larger radius than that in FIG. 15 and may not be folded. The wire harness 73 is led with a small gap against the top end of the outer clamp member 38. In FIG. 15, the wire harness 73 is bent smoothly along the curved portion 80 of the harness support wall 78. In FIGS. 15, 16, the slack preventing members 35 is located at a position 180 degree opposite to a bending direction of the wire harness 73.

When using the inner clamp member 77 in FIG. 12, the wire harness 73 can be bent with a large radius by forming long curved portions 80, 81 along the long harness support wall 78. When using the inner clamp member 31 in FIG. 7, the wire harness 73 can be bent with a further large radius by moving the bending point to inside of the vehicle to form the short curved surface 62' along the short harness guide 62 with a cutout. In the both cases, the wire harness 73 can be prevented securely from folding. The inner clamp member 31 in FIG. 7 is small because of the cutout and can rotate smoothly in a limited opening (mark 70) of the outer clamp member 38. Furthermore, the bending point of the wire harness 73 is moved to inside of the vehicle, so that the outer clamp member 38 can be miniaturized in length and radial directions of opening side of the outer clamp member 38.

While the forms of the invention herein disclosed constitute presently preferred embodiments, many others are possible. It is not intended herein to mention all the possible embodiments of the invention which will be apparent to those skilled in the art. It is understood that the term used herein are merely descriptive rather than limiting, in that various changes may be made without departing from the scope of this invention as defined by the following claims.

What is claimed is:

1. A harness holder, comprising:
    an inner clamp member for supporting a wire harness, said inner clamp member having a clamp body with a cylindrical portion having projecting means at axial ends thereof for engaging with grooves of a harness, and a harness support wall with a slack preventing member, extending axially from said clamp body in a direction of leading the harness out, for preventing slack of the wire harness; and
    an outer clamp member for supporting rotatably the inner clamp member, wherein
    said slack preventing member is formed integrally with an opposed harness guide of the harness support wall.

2. The harness holder according to claim 1, wherein said slack preventing member has a curved surface, a diameter of which increases outwardly in a direction of leading the harness out.

3. The harness holder according to claim 1, wherein said harness guide has a curved surface, a diameter of which increases outwardly in a direction of leading the harness out.

4. The harness holder according to claim 1, wherein said slack preventing member is formed longer than the harness guide in a direction of leading the harness out.

5. The harness holder according to claim 4, wherein a cutout is disposed opposite said slack preventing member and said harness guide is formed shortly at a side of the cutout.

6. The harness holder according to claim 1, wherein an opening is formed along a lengthwise direction of the harness between the harness guide and the slack preventing member.

7. The harness holder according to claim 1, wherein said harness guide is continued with an annular shape to the slack preventing member.

8. The harness holder according to claim 1, wherein the outer clamp member is provided at the top end thereof with a guide surface being positioned on a surface extending along a curved surface of the harness guide.

* * * * *